Figure 4:
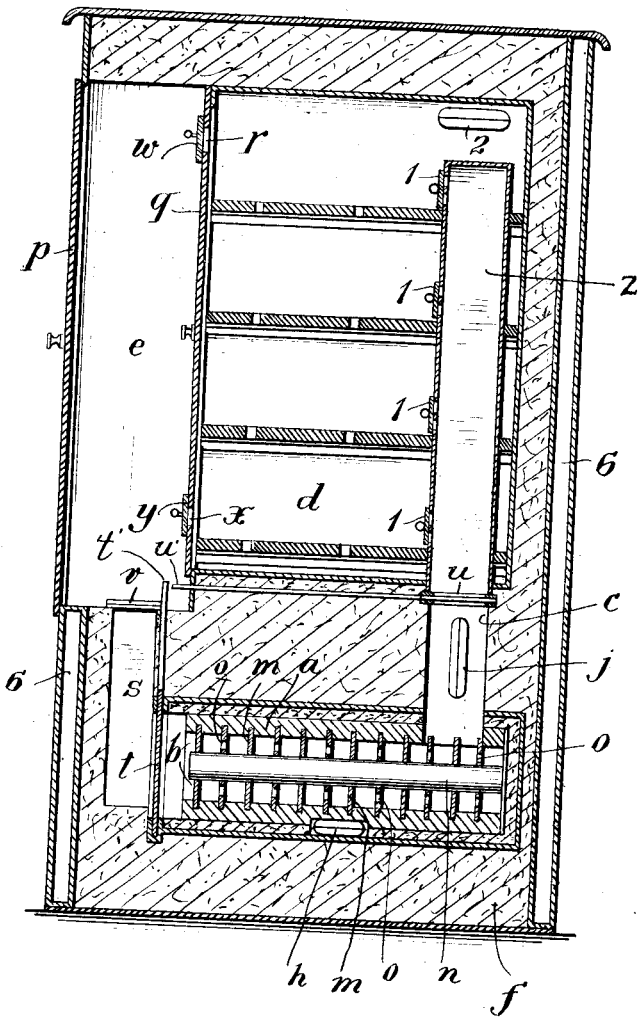

G. G. BELL.
COOKING APPARATUS.
APPLICATION FILED NOV. 7, 1911.
1,069,376.
Patented Aug. 5, 1913.
3 SHEETS—SHEET 1.
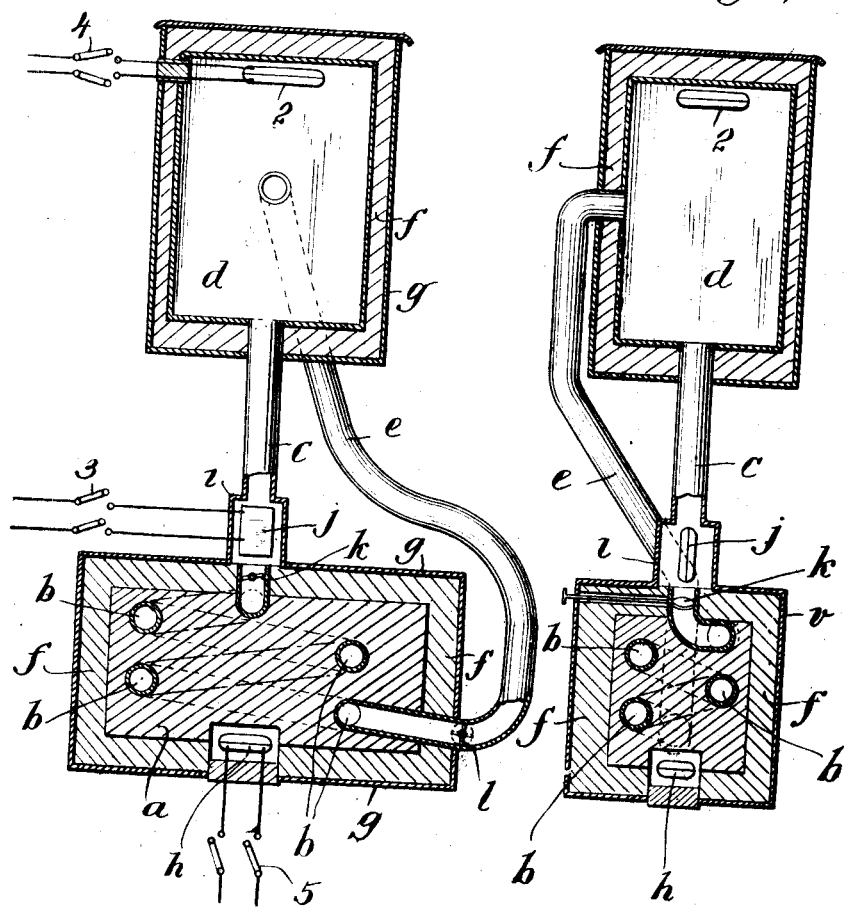
WITNESSES:
INVENTOR
George Gilbert Bell
BY
Kenyon & Kenyon
ATTORNEYS

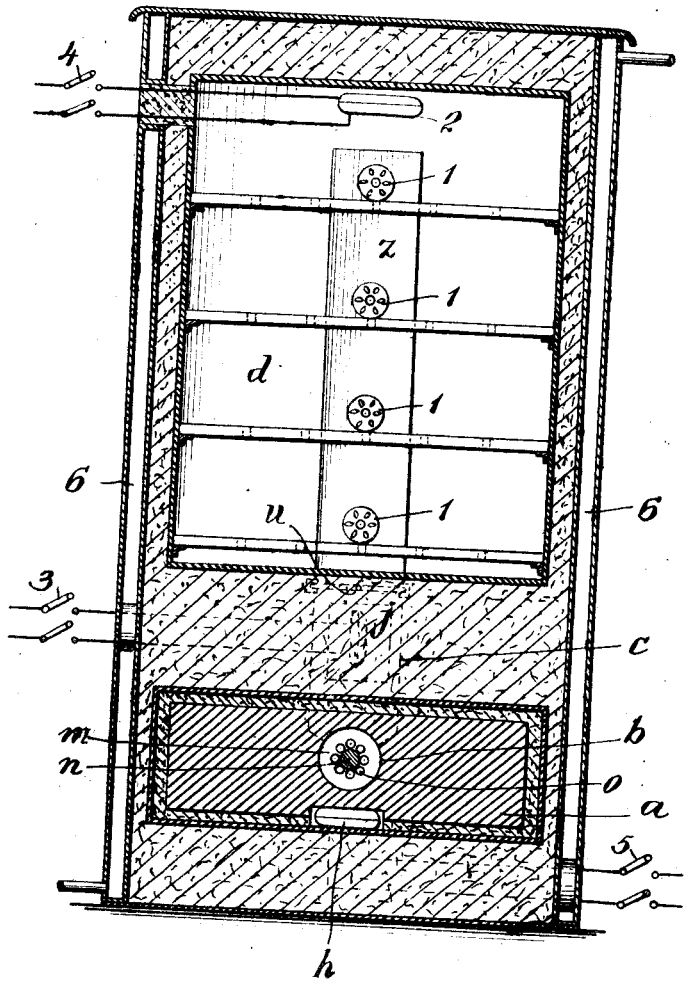

G. G. BELL.
COOKING APPARATUS.
APPLICATION FILED NOV. 7, 1911.

1,069,376.

Patented Aug. 5, 1913.
3 SHEETS—SHEET 3.

WITNESSES:

INVENTOR
George Gilbert Bell
BY
Kenyon & Kenyon
ATTORNEYS

UNITED STATES PATENT OFFICE.

GEORGE GILBERT BELL, OF KENSINGTON, LONDON, ENGLAND, ASSIGNOR TO ELECTRIC HEAT STORAGE COMPANY, A CORPORATION OF NEW YORK.

COOKING APPARATUS.

1,069,376.  Specification of Letters Patent.  Patented Aug. 5, 1913.

Application filed November 7, 1911. Serial No. 659,039.

*To all whom it may concern:*

Be it known that I, GEORGE GILBERT BELL, a subject of the King of Great Britain, and a resident of Kensington, London, England, have invented certain new and useful Improvements in Cooking Apparatus, of which the following is a specification.

This invention relates to improvements in apparatus for heating air or other media by means of electricity, in which the electrical energy is transformed into and is stored in the form of heat to be used as required, preferably by using a heat accumulator or a mass of material having a high specific heat value and a high thermal conductivity such as iron.

Now the present invention has for its object to provide means for promoting or increasing the circulation of the medium in such an electrical cooking apparatus. To this end the oven is arranged above the heat accumulator and is connected thereto by two pipes or ducts, one for the flow and the other for the return of the medium and in order to further increase the circulation of the heated air or other medium, auxiliary means for causing a circulation such as an auxiliary heater, is inserted in the flow pipe or conduit. Moreover an additional heater may be arranged in the oven near the top to provide "top heat" or to heat quickly for a short time if necessary. The air duct may be provided with baffle plates to provide zigzag paths for the air or the duct may be coiled or otherwise arranged so as to deflect the air and cause it to impinge against the heated sides of the duct, such deflections serving to more thoroughly heat the air and dampers or valves may be provided for regulating the flow of the air.

Referring to the accompanying drawings, Figure 1 is a sectional front elevation and Fig. 2 is a sectional side elevation of one arrangement of an improved heating apparatus according to this invention; and Figs. 3 and 4 are similar views of a modified arrangement of heating apparatus.

According to the arrangement illustrated in Figs. 1 and 2, the heat accumulator or mass $a$ is in the form of a parallelepiped and has a coiled air duct $b$ cast therein. The air duct $b$ emerges at one end at the middle of the top of the heat accumulator $a$ into the hot air supply pipe $c$ which passes up into the oven $d$ arranged immediately above the heat accumulator $a$. The return pipe $e$ for the cooled air is led into the other end of the air duct $b$ at the lower part of the heat accumulator $a$ so that the air is reheated in the duct $b$. The heat accumulator $a$ and oven $d$ are each inclosed in a casing $f$ of a heat insulating material which in turn is conveniently incased in a casing $g$ of sheet metal or other suitable material. The heat accumulator is fitted with a heater $h$ of known type arranged in a recess in the lower portion of the mass. In order to still further improve the circulation of the medium, an enlargement $i$ is suitably made in the hot air supply pipe $c$, at or near the point at which it leaves the heat accumulator $a$, to contain an additional heater $j$ which tends to set up additional convection currents in the air. The distribution of heat is efficiently controlled by dampers or valves $k$ and $l$ of any known type and arranged one at the outlet and the other at the inlet of the air duct $b$.

According to a modified and convenient arrangement as illustrated in Figs. 3 and 4, the heat accumulator $a$ is also in the form of a parallelepiped and is provided with a heating element $h$. The said heat accumulator has a horizontal and preferably cylindrical air duct $b$ provided with vertical plates $m$ serving as baffle-plates and suitably cast into the thermal mass or otherwise mounted in the duct $b$ at intervals along its length. The said plates preferably have central apertures through which is passed the central shaft or core $n$ and holes $o$ are punched or drilled in the plates $m$, the holes in succeeding plates being out of alinement, so that thus zig-zag or tortuous paths are provided for the air. The hot-air supply pipe or duct $c$ emerges at or near the inner end of the air duct $b$ in the heat accumulator $a$ and may pass directly up into the oven $d$ which, as before, is arranged immediately above the heat accumulator. The oven and heat accumulator are also incased in insulating material $f$. The return passage $e$ for the cooled air, which passage is formed between the outer oven door $p$ and the inner oven door $q$ communicates with the oven by holes $r$ in the oven door $q$, and leads into the conduit $s$ which opens into the front of the air duct $b$. The additional heater $j$ is in this construction arranged in the hot air supply pipe or duct $c$ itself. The distribution of heat is controlled by hit-and-miss valves *t* and *u* operated through handles *t'*, *u'* and these can be so operated as to completely isolate the heat accumulator *a*, and by a simple sliding damper *v*, and if desired a sliding damper or hit-and-miss valve *w* may be provided for further regulating the flow of air through the holes *r*. Moreover holes *x* with a damper or hit-and-miss valve *y* may be provided at the lower end of the oven door *q*.

In order to further control the distribution of the heat a duct or uptake *e* may be provided leading from, or forming a continuation of, the hot air supply duct *c* and this uptake is provided with dampers or valves *l* which can be so operated as to permit the hot air to be delivered to any desired part of the oven *d*. For instance, if most heat is required at the lower part of the oven, the lowermost damper or valve *l* is opened as shown, and if most heat is required at the top or at an intermediate part of the oven, the uppermost damper of valve *l* or an intermediate damper or valve *l*, respectively, is opened, the other dampers being then closed. This uptake *e* is of course not an essential part of the invention and may be dispensed with if desired, in which case the duct *c* would communicate direct with the oven *d*.

The cooking or heating apparatus according to this invention may, if desired, be provided with yet another and auxiliary electric heater 2 placed, as shown in Figs. 1, 2, 3 and 4, in the oven *d* near the top to provide "top heat" or to heat quickly for a short time if necessary. The heaters *j* and 2 may be adapted to be switched on when required by means of switches 3 and 4 respectively and the main heater *h* is switched on or off by a switch 5 according to the load on the central station or to equalize the demand of the cooking apparatus. Further the apparatus may, as shown in Figs. 3 and 4, be inclosed in a tank 6 for water which may be heated by any heat escaping through the heat insulating material *f*.

What I claim as new and desire to secure by Letters Patent, is:

1. The combination of an oven, an air heater for supplying heated air thereto provided with a heat storage mass having a passageway for the air therethrough deflected at numerous places, whereby the air will be retarded in its passage through the air heater and will be brought frequently into contact with the heated surfaces of the heat storage mass.

2. The combination of an air heater provided with a heat storage mass having a passageway for the air therethrough deflected at numerous places, whereby the air will be retarded in its passage through the air heater and will be brought frequently into contact with the heated surfaces of the heat storage mass.

3. The combination of an air heater provided with a heat storage mass having a series of projecting annular rings provided with holes arranged in the different rings in staggered fashion, whereby the air will be retarded in its passage through the air heater and will be brought frequently into contact with the heated surfaces of the heat storage mass, an oven supplied with heated air from the air heater, and an electrical heating element for heating the heat storage mass.

4. In a cooking device an air heater provided with a heat storage mass having a solid core and a series of projecting annular flanges or rings provided with holes arranged in staggered fashion, whereby the air will be retarded in its passage through the air heater and will be brought frequently into contact with the heated surface of the heat storage mass and its projecting rings.

5. Apparatus for heating air or other media for cooking or other purposes, comprising in combination, a heat accumulator consisting of a mass of a material capable of storing heat and being a good conductor of heat, electrical means for heating said mass, a duct in said mass through which the air or other medium to be heated is adapted to pass, baffles in said duct so adapted as to provide a zig-zag or tortuous path for the air or other medium through said duct, a chamber serving as an oven and connected by passages with both ends of said duct, and means for promoting circulation of the air or other medium through said duct and said chamber, substantially as set forth.

6. Apparatus for heating air or other media for cooking or other purposes, comprising in combination, a heat accumulator consisting of a mass of a material capable of storing heat and being a good conductor of heat, electrical means for heating said mass, a duct in said mass through which the air or other medium to be heated is adapted to pass, a chamber connected with both ends of said duct, and means for promoting circulation of the air or other medium through said duct and said chamber, substantially as set forth.

7. Apparatus for heating air or other media for cooking or other purposes, comprising in combination, a heat accumulator consisting of a mass of a material capable of storing heat and being a good conductor of heat, electrical means for heating said mass, a duct in said mass through which the air or other medium to be heated is adapted to pass, a chamber connected with both ends of said duct, and electrical means for promoting circulation of the air or other medium through said duct and said chamber, substantially as set forth.

8. Apparatus for heating air or other media for cooking or other purposes, comprising in combination, a heat accumulator consisting of a mass of a material capable of storing heat and being a good conductor of heat, electrical means for heating said mass, a duct in said mass through which the air or other medium to be heated is adapted to pass, a chamber serving as an oven arranged above said mass, a passage connecting one end of said duct with said chamber, a passage connecting the other end of said duct with said chamber, an auxiliary electric heating means in said chamber and auxiliary means in one of said passages for promoting circulation of the air or other medium through said duct and said chamber, substantially as set forth.

9. The combination of an oven, an air heater arranged below the oven, an electrical heating element for the air heater, a vertical air flue leading from the air heater to the oven, an electrical heating element arranged in the flue, and means for cutting the electrical heating element for the air heater out of operation and the electrical heating element in the vertical flue into operation for heating the air therein and for starting and maintaining an upward flow of heated air therein.

10. The combination of an oven, an air heater provided with a heat storage mass arranged below the oven, an electrical heating element for the said heat storage mass, a vertical air flue leading from the air heater to the oven, an electrical heating element arranged in the flue for heating the air therein and for starting and maintaining an upward flow of heated air therein, means for cutting one of the heating elements into operation and the other out of operation, and a return passage from the oven to the air heater for the return to it of the spent heated air.

11. Apparatus for heating air or other media for cooking or other purposes, comprising in combination, a heat accumulator consisting of a mass of a material capable of storing heat and being a good conductor of heat, electrical means for heating said mass, a duct in said mass through which the air or other medium to be heated is adapted to pass, a chamber serving as an oven arranged above said mass, a passage connecting one end of said duct with said chamber, a passage connecting the other end of said duct with said chamber, auxiliary means in one of said passages for promoting circulation of the air or other medium through said duct and said chamber, and means in the said passages for regulating the circulation of the air or other medium, substantially as set forth.

12. The combination of an oven, an air heater arranged below the oven, an electrical heating element for the air heater, a vertical air flue leading from the air heater to the oven, an electrical heating element arranged in the flue for heating the air therein and for starting and maintaining an upward flow of heated air therein, and a return passage from the oven to the air heater for the return to it of the spent heated air.

13. Apparatus for heating air or other media for cooking or other purposes, comprising in combination, a heat accumulator consisting of a mass of a material capable of storing heat and being a good conductor of heat, electrical means for heating said mass, a duct in said mass through which the air or other medium to be heated is adapted to pass, a chamber serving as an oven and connected with one end of said duct, an uptake in said chamber communicating with the other end of said duct and adapted to be placed in communication with said chamber, means for regulating the supply of hot air or other medium from said uptake into said chamber, and means for circulating the air or other medium through said duct and said chamber, substantially as set forth.

14. Apparatus for heating air or other media for cooking or other purposes, comprising in combination, a heat acumulator consisting of a mass of a material capable of storing heat and being a good conductor of heat, electrical means for heating said mass, a duct in said mass through which the air or other medium to be heated is adapted to pass, baffles in said duct so adapted as to provide a zig-zag or tortuous path for the air or other medium through said duct, a chamber serving as an oven and arranged above said mass, an uptake in said chamber communicating with one end of said duct, means for controlling the supply of hot air or other medium from said uptake into said chamber, an inner door of said chamber, an outer door of said chamber, a passage between said doors, holes in said inner door to allow the air or other medium to pass from said chamber into said passage between said doors, means for regulating the flow of air or other medium through said holes, a conduit connecting the passage between said two doors with the other end of the said duct, electrical heating means in the first-named passage for promoting circulation of the air or other medium through said duct and said chamber, means in the said passages for regulating the circulation of the air or other medium, an auxiliary heating means in said chamber, a covering of heat insulating material surrounding said mass and said chamber, and a water jacket surrounding said covering of insulating material, substantially as set forth.

15. The combination of an oven, an air heater for supplying heated air thereto, a door for the oven, an inclosed space outside of the oven door, one or more openings in the oven door for the escape of heated air from the oven into such inclosed space, a door in the wall of such inclosed space opposite the oven door, and a return passage from the inclosed space to the air heater, whereby the spent heated air may be used to prevent undue cooling of the oven, especially when access is being had to the oven, and may be reheated and used over again.

In testimony whereof, I have signed my name to this specification, in the presence of two subscribing witnesses.

GEORGE GILBERT BELL.

Witnesses:
O. J. WORTH,
H. D. JAMESON.